Figure 1:
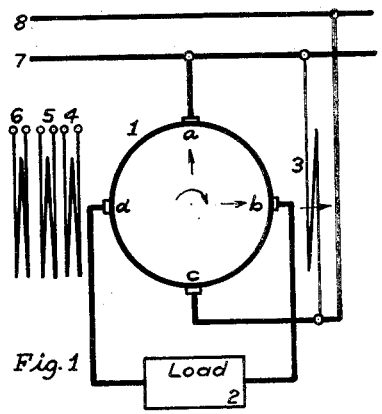

March 29, 1938. J. M. PESTARINI 2,112,604

DIRECT CURRENT ELECTRICAL GENERATOR

Filed Feb. 21, 1935

INVENTOR.

Joseph Maximus Pestarini

Patented Mar. 29, 1938

2,112,604

UNITED STATES PATENT OFFICE 2,112,604

DIRECT CURRENT ELECTRICAL GENERATOR

Joseph Maximus Pestarini, Grant City, Staten Island, N. Y.

Application February 21, 1935, Serial No. 7,594
In Italy February 28, 1934

4 Claims. (Cl. 171—123)

The present invention relates to electrical apparatus where several direct currents, say $Ia$, $Ib$, $Ic$, ... $In$, are given and it is required to create a direct current $I_2$ which is a desired linear function of the individual currents.

In other words the current $I_2$ is required to be:

$$I_2 = KaIa + KbIb + KcIc + \ldots + KnIn$$

where the positive or negative constants $Ka$, $Kb$, $Kc$ ... $Kn$ are given.

Such a desire is of special value when the given currents $Ia$, $Ib$, $Ic$ ... $In$ are exact measure of some variable and it is desired to obtain a current equal to some linear function of them, for instance to their algebraic sum, some of them being taken as positive and some as negative, some of them being taken in a larger and some in a smaller proportionality.

A similar case is the one where it is desired to substitute many antagonistic windings upon a large machine by only one winding the ampere turns of which are a desired algebraic combination of the former.

The present invention consists in the use of an auxiliary direct current machine supplying a direct current of substantially constant intensity whatever may be the required voltage within its operation range, and where this current intensity is controlled by some field ampere turns; the machine being provided, according to the invention, with as many controlling field coils as there are given currents, say $n$ coils, the turns of these coils being in the same ratio as the given constants $Ka$, $Kb$, $Kc$, ... $Kn$ while on the same machine additional windings provide for the elimination of any undesired term from the value of the supplied current.

The auxiliary direct current machine here in consideration may be of various kinds and the most preferable is a metadyne.

The metadyne has been dealt with in many previous patents: No. 1,969,699; No. 1,945,447; No. 1,962,030. The metadyne is essentially a direct current rotating machine having a rotor with winding and commutator like a conventional dynamo, and a stator affording a path of low reluctance to the flux created by the rotor ampere turns; two sets of brushes are generally provided, the current traversing each set creating by its rotor ampere turns a flux inducing an electromotive force between the brushes of the other set; one set called primary and traversed by a current called primary current, has its brushes kept at a substantially constant difference of voltage, and the other set, called secondary and traversed by a current called secondary current, has its brushes connected to the electrical consumers supplied with current by the metadyne; the stator of the metadyne may be provided with windings which endow the machine with the desired characteristics suitable to the application in consideration. A description in detail of the metadyne principles, is given in a paper entitled "Esquisse sur la metadyne" by J. M. Pestarini, in the "Bulletin Scientifique A. I. M." No. 4, April, 1931 of "L'Association des Ingenieurs electriciens" published by the "Institut Electrotechnique Montefiore", Liege, Belgium.

The field winding which controls the secondary current of the metadyne, that is the current supplied by the metadyne to the consumers, is a stator winding, called "secondary variator winding", the magnetic axis of which has essentially the direction of the rotor ampere turns due to the secondary current. As the voltage impressed upon the primary brushes is kept constant, the secondary flux, which induces this electromotive force must be constant, and therefore the algebraic sum of the rotor and stator ampere turns in the direction of the secondary flux, which is the direction of the secondary rotor ampere turns, will be constant, and thus the ampere turns of the secondary variator winding will control the intensity of the secondary current regardless of the supplied secondary voltage.

According to this invention the secondary variator winding consists of many members, as many members as there are given currents plus one. The number of turns of these component windings, say $K'a$, $K'b$, $K'c$ ... $K'n$ is determined by the following relation.

$$K'I_2 + K'aIa + K'bIb + K'cIc + \ldots + K'nIn + B = A$$

where $K'$ are the equivalent turns of the rotor winding, and $A$ are the ampere turns required for creating the secondary flux, and $B$ are the ampere turns of the additional member of the secondary variator winding.

According to the invention this additional member of the secondary variator winding will create exactly the ampere turns $A$ and hence we will obtain $$I_2 = -\frac{K'a}{K'}Ia - \frac{K'b}{K'}Ib - \frac{K'c}{K'}Ic - \ldots - \frac{K'n}{K'}In$$

which will grant the desired result provided that one makes $$K'a = -K'Ka; K'b = -K'Kb; K'c = -K'Kc; \ldots K'n = -K'Kn$$

Figure 2:
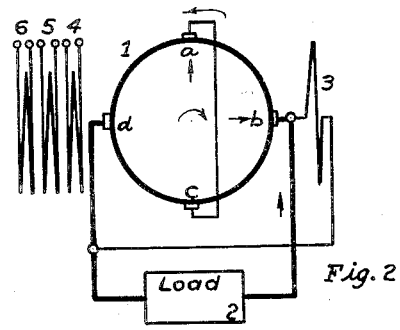
Figure 3:
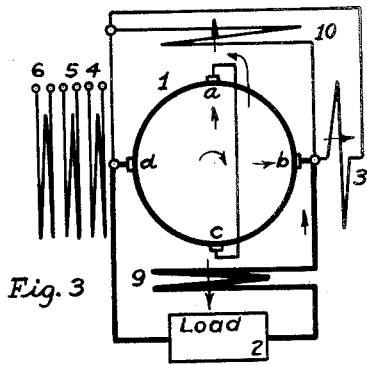
Figure 4:
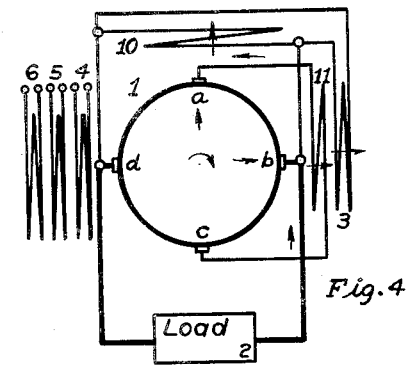
Figure 5:
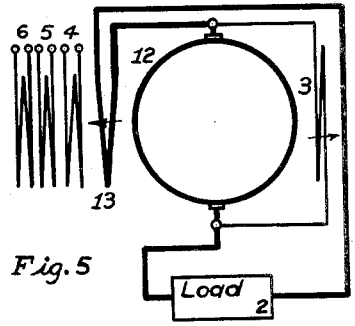
Figure 6:
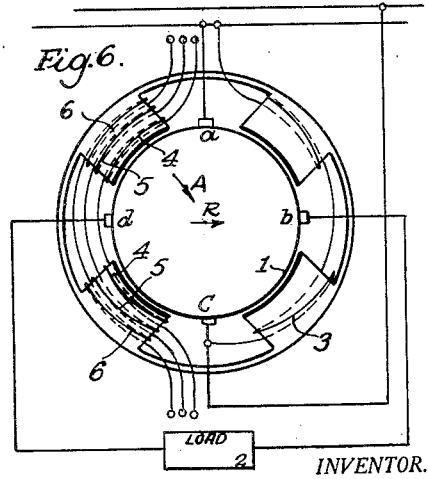

The invention will be better understood with reference to the accompanying drawing: Fig. 1 shows the general arrangement with a metadyne the primary brushes of which are connected to a primary source; Fig. 2 shows the arrangement with a metadyne having its primary brushes short circuited; Fig. 3 and Fig. 4 are alternative arrangements to Fig. 2 with improved stator windings; Fig. 5 shows the general arrangement with a dynamo as an auxiliary machine. Figure 6 shows the metadyne of Figure 1 in a more detailed manner.

Referring to Fig. 1, the metadyne, indicated by 1, has its primary brushes a and c connected to a network 7, 8 assumed to be at a substantially constant voltage. The secondary brushes b and d are connected to the load 2 to which the resulting current has to be supplied. The secondary variator winding has four members, the members 4, 5, and 6, traversed by the given currents assumed to be three, and the additional member 3. The latter gives the ampere turns necessary to create the secondary flux, and it is connected across the primary brushes. By this arrangement a reasonable variation of the primary voltage will not interfere with the accuracy with which the current L is obtained, because when the primary voltage varies, the ampere turns of the additional member will vary in the same direction and to the exact amount necessary to produce the new value of secondary flux, the iron being assumed far from saturation.

Figure 6 shows the metadyne of Figure 1 in a more detailed manner in order to illustrate the stator winding arrangement, using the well known construction clearly explained in Patents Nos. 1,967,159, 1,962,030, and 2,038,380, which I shall hereunder briefly describe. To facilitate commutation, the commutating zone is not covered by the main poles and as there are two axes of commutation, the polar segments are four in number, as shown by Figure 6. Further, in order to eliminate any interference in the commutation zone from the main stator windings, the stator windings having their magnetic axes in the direction of, say, the secondary axis of commutation are divided into two coils, each coil being interlinked with one polar segment only, as shown by Figure 6. Thus the stator winding, say, 4, having its magnetic axis on the secondary axis of commutation is divided into two coils interlinked with two adjacent polar segments, said coils having their magnetic axes along the arrows A, B, respectively, so that both coils have their resultant magnetic axis along the arrow R which is in the direction of the secondary axis of commutation.

Fig. 2 shows the general arrangement where a metadyne having its primary brushes short circuited is used. In this case the additional member 3 of the secondary variator winding is connected across the secondary brushes b and d but it has to create only the ampere turns necessary for inducing the small primary electromotive force for overcoming the ohmic drop in the short-circuited primary circuit; it is clear that this small primary electromotive force will be proportional to the secondary voltage if the iron is not saturated.

It has been found that a more stable operation is obtained when the secondary current of the metadyne traverses a stator winding which induces by its ampere turns an electromotive force between the secondary brushes opposing the secondary current.

The scheme of Fig. 3 shows such a winding in 9. It shows another stator winding 10 having its magnetic axis in the direction of the commutation axis of the primary current and inducing between the secondary brushes an electromotive force in the same direction as that induced by the original primary current. By this means the primary current is decreased as much as it is desired. By adjustment of the windings 3 and 10, very accurate results may be obtained.

It has been found that a more stable operation is obtained also when the primary current traverses a stator winding which induces by its ampere turns an electromotive force between the primary brushes opposing the primary current. Such an arrangement is shown by Fig. 4 the primary brushes a and c having been short-circuited through the low resistance winding 11. This arrangement is particularly interesting when the primary current is reduced by the provision of the stator winding 10 inducing between the secondary brushes an electromotive force in the same direction as the one induced by the primary rotor ampere turns the winding 10 being assumed inoperative.

In any case the additional member 3, of the secondary variator winding has to compensate for the ampere turns of the winding 11 as well.

The additional windings 9, 10, and 11 described while referring to schemes showing the primary brushes short circuited, may be applied as well on a metadyne with its primary brushes connected to the terminals of a primary source of direct current at constant voltage. The operation in both cases is the same, the value of the difference of voltage between the primary brushes may be kept equal to zero or equal to a large value, it does not matter, provided that this value is kept substantially constant. In the figures the arrows show the relative direction of the rotor ampere turns and stator windings and the direction of the current in the primary and secondary circuits; other arrows show the direction of movement. The directions indicated by the arrows are based upon the assumption that the armature winding is a clockwise winding. Arrows have not been shown in connection with the stator windings 4, 5, and 6 which are supposed to be the elements of the secondary variator traversed by the given direct currents, because the direction of the given currents and therefore the direction of their ampere turns may be any whatever.

Instead of a metadyne, a conventional dynamo may be used as Fig. 5 shows. The dynamo 12 is provided with a plurality of field windings, the shunt field winding 3, the series field winding 13 and as many more field windings 4, 5, 6, as there are given currents combined into the given linear function. The dynamo 12 is supposed to rotate at its critical speed in respect to its shunt winding that is at the speed which would give rise to a building-up of voltage due to the shunt winding. Therefore the ampere turns of the windings 4, 5, and 6 must compensate the ampere turns of the series winding 13, and thus the current supplied by the dynamo 12 will be made equal to the desired linear function.

The use of the metadyne is generally preferable because of its property of a very quick response.

Many modifications of the windings may be conceived by one versed in the art, or other applications may be found, yet remaining within the scope of the present invention.

Having now particularly described and ascertained the nature of my said invention, and in what manner the same is to be performed, I declare that what I claim is:

1. In a metadyne machine for feeding a current which is a linear function of a plurality of given direct currents, the combination with a pair of primary brushes determining a commutating axis, a pair of secondary brushes determining a commutating axis perpendicular to the first mentioned commutating axis, and a consumer network connected across said secondary brushes, of a secondary variator unit comprising a plurality of field windings located in the commutating axis of the secondary brushes, each of said windings being traversed by one of said given direct currents, a field winding adapted to produce the necessary ampere turns for creating the secondary flux, said winding being located in the commutating axis of the secondary brushes and connected across said secondary brushes, a field winding located in the commutating axis of the secondary brushes and connected across the primary brushes in such manner as to induce between said primary brushes an electromotive force opposing the primary current.

2. In a metadyne machine, as claimed in claim 1, a field winding situated in the commutating axis of the primary brushes and connected across the secondary brushes in such manner as to induce between the secondary brushes an electromotive force in the same direction as that induced by the original primary current.

3. In a metadyne machine for supplying direct current which is a linear function of a plurality of given direct currents, the combination with an armature comprising windings connected to a commutator having a set of primary brushes determining a primary axis of commutation and a set of secondary brushes determining a secondary axis of commutation at about 90 electrical degrees from the primary set, of means for maintaining the potential of each of said primary brushes at a substantially constant value during the operation, means for connecting the secondary brushes to a circuit of consumers, the E. M. F. induced across the brushes of one set being mainly due to the flux created by the armature ampere turns set up by the current traversing the other set, a plurality of stator windings having their magnetic axis on the secondary axis of commutation, each of said windings being traversed by one of said given direct currents, a stator winding having its magnetic axis on the secondary axis of commutation connected across the primary brushes and setting up ampere turns in the same direction as the secondary armature ampere turns, a stator winding having its magnetic axis in the same direction as the primary axis of commutation and connected across the secondary brushes, and setting up ampere turns in the same direction as the primary armature ampere turns and stator windings traversed by the current of a set of brushes and having their magnetic axis in the direction of the axis of commutation of the other set of brushes and setting up ampere turns which induce an E. M. F. opposing the current traversing the said stator windings.

4. In a metadyne machine for supplying direct current which is a linear function of a plurality of given direct currents, the combination with an armature comprising windings connected to a commutator having a set of primary brushes determining a primary axis of commutation and a set of secondary brushes determining a secondary axis of commutation at about 90° electrical degrees from the primary set of means for connecting said primary brushes with a low-resistance conductor, means for connecting the brushes of the secondary set to a circuit of consumers, the E. M. F. induced across the brushes of one set being mainly due to the flux created by the armature ampere turns set up by the current traversing the other set, a plurality of stator windings having their magnetic axis on the secondary axis of commutation, each of said windings being traversed by one of said given direct currents, a stator winding having its magnetic axis on the secondary axis of commutation connected across the primary brushes and creating ampere turns in the same direction as the secondary armature ampere turns, a stator winding having its magnetic axis in the same direction as the primary axis of commutation and connected across the secondary brushes, and setting up ampere turns in the same direction as the primary armature ampere turns and stator windings traversed by the current of a set of brushes and having their magnetic axis in the direction of the axis of commutation of the other set of brushes and setting up ampere turns which induce an E. M. F. opposing the current traversing the said stator winding.

J. M. PESTARINI.